United States Patent
Keller

(10) Patent No.: US 10,260,538 B2
(45) Date of Patent: *Apr. 16, 2019

(54) ROPE CLAMP SYSTEM

(71) Applicant: Landscape Structures Inc., Delano, MN (US)

(72) Inventor: Thomas L. Keller, Delano, MN (US)

(73) Assignee: Landscape Structures Inc., Delano, MN (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/162,798

(22) Filed: May 24, 2016

(65) Prior Publication Data
US 2016/0265564 A1    Sep. 15, 2016

Related U.S. Application Data

(63) Continuation of application No. 14/515,880, filed on Oct. 16, 2014, now Pat. No. 9,375,609.

(60) Provisional application No. 61/896,455, filed on Oct. 28, 2013.

(51) Int. Cl.
| | |
|---|---|
| A63B 22/00 | (2006.01) |
| F16B 2/06 | (2006.01) |
| A63B 29/02 | (2006.01) |
| A63B 9/00 | (2006.01) |
| F16G 11/06 | (2006.01) |
| F16B 2/12 | (2006.01) |

(52) U.S. Cl.
CPC .............. *F16B 2/06* (2013.01); *A63B 9/00* (2013.01); *A63B 29/02* (2013.01); *F16G 11/06* (2013.01); *A63B 2009/004* (2013.01); *A63B 2208/12* (2013.01); *F16B 2/12* (2013.01); *Y10T 29/49959* (2015.01)

(58) Field of Classification Search
None
See application file for complete search history.

(56) References Cited

U.S. PATENT DOCUMENTS

| | | | | |
|---|---|---|---|---|
| 1,611,296 | A | * 12/1926 | West | F16G 11/048 24/136 R |
| 2,133,936 | A | * 10/1938 | McConnell | D06F 53/00 24/133 |
| 2,180,096 | A | * 11/1939 | Thomas, Jr. | H02G 3/22 174/78 |

(Continued)

OTHER PUBLICATIONS

Office Action for Canadian Patent Application No. 2,868,604 dated Jan. 4, 2017, 3 pages.

(Continued)

*Primary Examiner* — Stephen R Crow
(74) *Attorney, Agent, or Firm* — Wesley W. Malherek; Kelly, Holt & Christenson PLLC

(57) ABSTRACT

A system for spreading tension at a rope connection point on a structure is provided. The system comprises a connection mechanism configured to receive a rope. The system also comprises a fastening mechanism configured to couple the connection mechanism to the structure at the rope connection point. The rope is configured to enter the connection mechanism at an inlet point and exit the connection mechanism at an outlet point, such that a tension applied to the rope is spread between the inlet point and the outlet point.

20 Claims, 6 Drawing Sheets

(56) References Cited

U.S. PATENT DOCUMENTS

| | | | | |
|---|---|---|---|---|
| 3,357,066 A | * | 12/1967 | Moritz | F16G 11/06 |
| | | | | 403/211 |
| 4,097,169 A | * | 6/1978 | Kelly | F16B 2/10 |
| | | | | 135/119 |
| 4,169,652 A | * | 10/1979 | Hockele | H01R 4/38 |
| | | | | 439/781 |
| 4,533,136 A | * | 8/1985 | Smith | A63B 22/0605 |
| | | | | 482/64 |
| 4,592,544 A | * | 6/1986 | Smith | A63B 22/0605 |
| | | | | 482/64 |
| 4,982,932 A | * | 1/1991 | Baker | E04H 17/12 |
| | | | | 174/154 |
| 5,738,552 A | | 4/1998 | Halbach | |
| 5,743,820 A | | 4/1998 | Espinosa | |
| D424,924 S | * | 5/2000 | Ackerman | D13/149 |
| 6,126,490 A | | 10/2000 | Anderson, Jr. | |
| 6,152,429 A | * | 11/2000 | Pettigrew | E04H 17/10 |
| | | | | 160/328 |
| 6,595,472 B1 | | 7/2003 | Pisczak | |
| 7,032,867 B2 | * | 4/2006 | Johnson | E04B 1/003 |
| | | | | 248/74.1 |
| 7,175,548 B2 | | 2/2007 | McNulty | |
| 8,031,472 B2 | | 10/2011 | Bicket | |
| 8,206,056 B2 | * | 6/2012 | O'Banion | E01F 13/028 |
| | | | | 256/13.1 |
| 8,454,504 B2 | * | 6/2013 | Michaeli | A61B 17/0293 |
| | | | | 600/222 |
| 8,526,180 B2 | | 9/2013 | Rayner | |
| 8,925,279 B2 | | 1/2015 | Pantelides | |
| 9,025,317 B2 | | 5/2015 | Richardson | |
| 9,375,609 B2 | * | 6/2016 | Keller | A63B 9/00 |
| 9,695,976 B2 | * | 7/2017 | Hill | F16M 13/022 |
| 2005/0269158 A1 | * | 12/2005 | Fulton | A01M 31/02 |
| | | | | 182/187 |
| 2007/0191844 A1 | | 8/2007 | Carls | |
| 2009/0039125 A1 | | 2/2009 | Bock | |
| 2009/0265972 A1 | | 10/2009 | Chang | |
| 2010/0037544 A1 | * | 2/2010 | Musgrave | E04H 15/18 |
| | | | | 52/222 |
| 2014/0175233 A1 | | 6/2014 | Han | |
| 2014/0243119 A1 | | 8/2014 | Whalen | |
| 2015/0060634 A1 | | 3/2015 | Munot | |
| 2015/0119199 A1 | | 4/2015 | Keller | |
| 2016/0331431 A1 | * | 11/2016 | Gephart | A61B 17/8076 |
| 2017/0143394 A1 | * | 5/2017 | Goodwin | A61B 17/823 |

OTHER PUBLICATIONS

"Quality Characteristics", COROCORD Raumnetz GmbH, Retrieved at <<www.corocord.com>> Copyright 2010 by COROCORD Raumnetz GmbH, 4 pages.

Office Action for Canadian Patent Application No. 2,868,604, dated May 3, 2016, 3 pages.

* cited by examiner

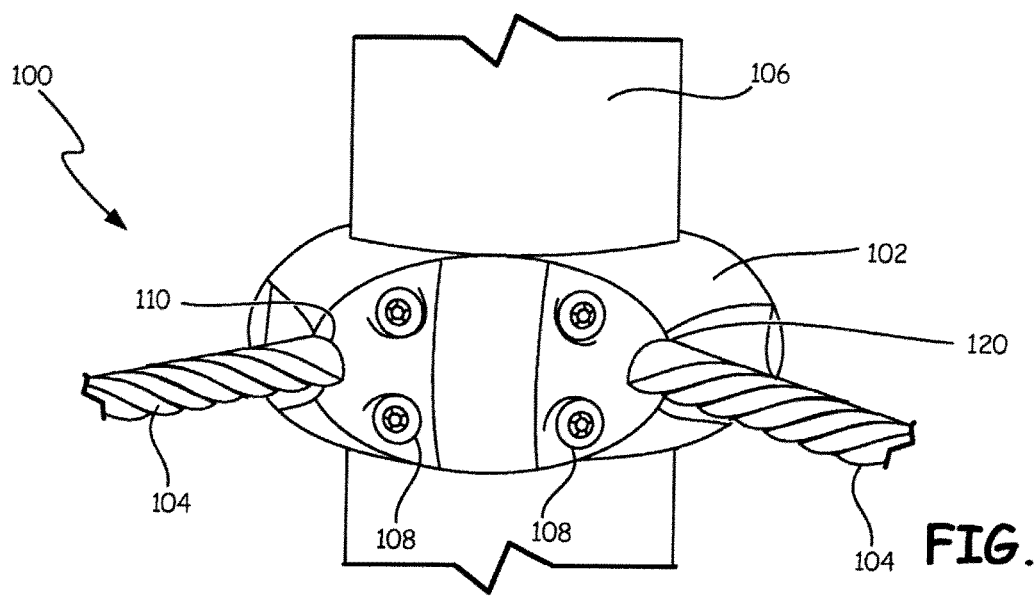
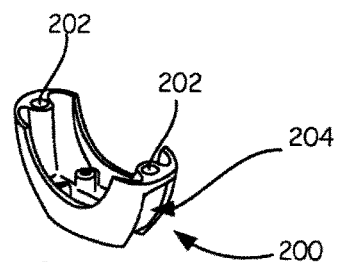
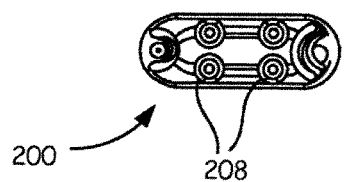
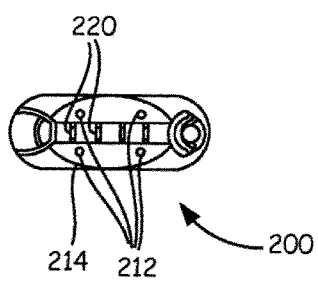
FIG. 1
FIG. 2A
FIG. 2B
FIG. 2C

ROPE CLAMP SYSTEM

CROSS-REFERENCE TO RELATED APPLICATION

The present application claims the priority of U.S. patent application Ser. No. 14/515,880, filed Oct. 16, 2014, which is based on and claims the priority of provisional application Ser. No. 61/896,455, filed on Oct. 28, 2013, the contents of which is hereby incorporated by reference in its entirety.

BACKGROUND

Play structures, and rope based climbing structures are known in the art. A known problem facing outdoor climbing structures is that of ropes fraying or breaking as a result of wear and tear. One cause of this wear and tear is the strain placed on the ropes as a result of tight angles, or pinch points, created in securing the ropes to structures.

The prior art includes mechanisms to affix lengths of rope to a structure. The most common and simple way to affix a rope or cable to a play structure is by fixing the rope to a pole or tubing on the structure. However, the direct fixture introduces uneven strain on the rope and raises the likelihood of fraying. A limitation of this and other such approaches is the wear and tear on ropes at pinch points in a play structure configuration. One known solution to the pinching problem is to use multiple lengths of rope at a single corner, in order to avoid the stress of a single rope bent at an acute angle.

SUMMARY

A system for spreading tension at a rope connection point on a structure is provided. The system comprises a connection mechanism configured to receive a rope. The system also comprises a fastening mechanism configured to couple the connection mechanism to the structure at the rope connection point. The rope is configured to enter the connection mechanism at an inlet point and exit the connection mechanism at an outlet point, such that a tension applied to the rope is spread between the inlet point and the outlet point.

These and various other features and advantages that characterize the claimed embodiments will become apparent upon reading the following detailed description and upon reviewing the associated drawings.

BRIEF DESCRIPTION OF THE DRAWINGS

FIG. 1 is a front view of a rope clamp system mounted on a pole according to one embodiment.

FIG. 2A is a perspective view of a portion of a rope clamp system according to one embodiment.

FIG. 2B is a rear elevation view of a front portion of the rope clamp system according to one embodiment.

FIG. 2C is a front elevation view of the rope clamp system with a front cover attached according to one embodiment.

DETAILED DESCRIPTION OF ILLUSTRATIVE EMBODIMENTS

Figure 3A:
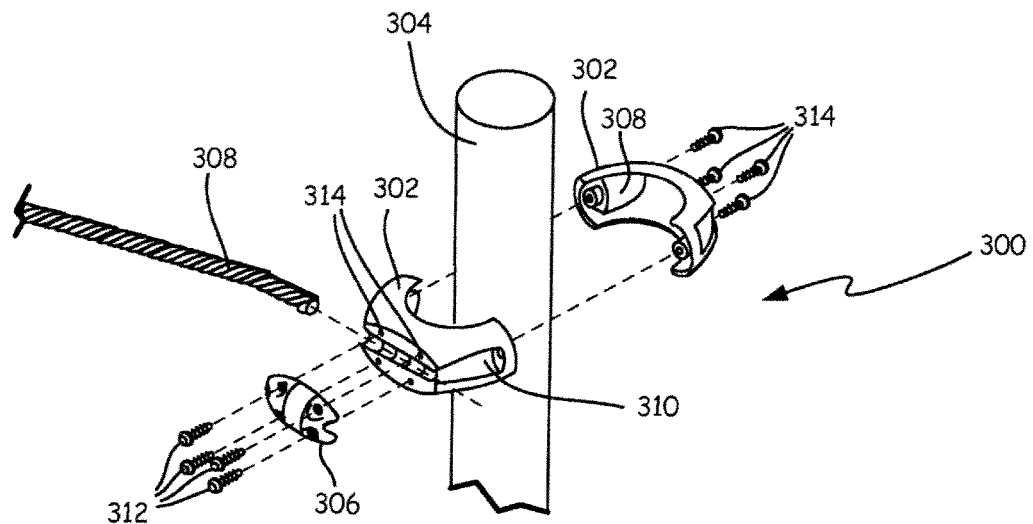
FIG. 3A is an exploded rear-view of a rope clamp system mounted on a pole according to one embodiment.

FIG. 1 is a front view of a rope clamp system mounted on a pole according to one embodiment. Rope clamp system 100 comprises a clamp 102 that receives a rope 104 at a first point 110 and the rope 104 exists at second point 120. The first point 110 and second point 120 are spaced apart on clamp 102 such that the angles of entry and exit are configured such that they reduce the strain on a rope at a single point by spreading the strain to two separate points at various angles, and in some embodiments at obtuse angles. Further, the first and second points are, as shown FIG. 1, along an axis parallel to the top and bottom of the rope clamp system.

Rope clamp system 100 is configured to be attachable to a pole 106 such that rope clamp system 100 does not move along the pole but is fixably attached to the pole through the rope clamp system 100 such that even pressure is applied along a full length of contact area between a rope 104 and the rope clamp system 100. A problem in play structures for children that involve ropes is due to fraying or stress on such ropes. This fraying can, in some circumstances, cause breakages. The breakages can present a danger to children playing on such systems that may not be easily detected by visual inspection of the equipment until after a breakage occurs. As can be seen in FIG. 1, rope clamp system 100 allows for the rope 104 to enter rope clamp 102 at a first point 110 and leave the rope clamp 102 at a second point 120, creating two angles to spread the stress of the crossing across the full contact area between the rope 104 and the rope clamp 102. instead of a single point. This configuration results in the desired angle at the rope crossing point, with a reduced pressure on the rope 104, thus reducing wear and lessening the likelihood of fraying or breakage. The rope clamp system 100 can be configured, in some embodiments, such that a variety of desired angles are available to create other climbing structure configurations by adjusting the location of the rope clamp 102 along the length of the pole 106.

FIGS. 2A, 2B, and 2C show interior views of the rope clamp 102 shown in FIG. 1. FIG. 2A illustrates a perspective view of rope clamp portion 200 in accordance with one embodiment. FIG. 2B shows a rear view of a front portion of a rope clamp portion 200. FIG. 2C shows a front elevation view of FIG. 2C without the front cover attached in accordance with one embodiment. Rope clamp portion 200 comprises connection points 202 and a rope path 204. Connection points 202 allow a first rope clamp portion 200 to be attached to a second rope clamp portion 200 such that, as shown in FIG. 1, the rope clamp system 102 encircles the entirety of a pole or other cylindrical structure, such as a pipe. However, these connectors 202 also allow for the rope clamp system to be attached such that it engages a wall or other portion of a climbing structure, thus not requiring a second rope clamp portion 200 in accordance with another embodiment. Rope path 204 shows where the rope engages a front cover of the rope clamp portion 200. The front cover engages rope clamp portion 200, fixing the rope 104 within the rope clamp portion 200 at a location comprising the bottom of the rope clamp portion 200 of FIG. 2A.

FIG. 2B shows a rear view of a front portion of rope clamp portion 200. FIG. 2B illustrates that four fastener receivers 208 are included in the illustrated particular embodiment. However, in an alternative embodiment, only one or two fastener receivers 208 are used and additionally, in alternative embodiments, more fastener receives 208 could also be used to hold the front cover 214 in place on the rope clamp portion 200. The fastener receivers 208 engage fasteners passing through the front cover 214 of the rope clamp portion 200, thus securing a rope 104 to the rope clamp portion 200. FIG. 2C shows the rope clamp portion 200 of FIG. 2B, wherein the front portion is attached over the rope clamp portion 200. In one particular embodiment, the fasteners 212 securing the front cover 214 to the rope clamp portion 200 may comprise screws, in one embodiment. In one embodiment, the screw comprises threads along an entire length. In another embodiment, bolts could be used with or without an accompanying nut. However, such fasteners could also comprise any suitable removable fastening device.

Fastener receivers 208, in one embodiment, also perform an anti-slip function. Once a rope 104 is engaged within the rope clamp portion 200, it is important to ensure that the rope does not slip substantially once attached to a pole 106. The fastener receivers 208, in addition to receiving a fastening mechanism, are also configured to engage the rope 104 within the rope clamp portion 200 such that the fastener receivers provide pressure on the rope 104, keeping the rope 104 substantially in place within the rope clamp portion 200.

Figure 3B:
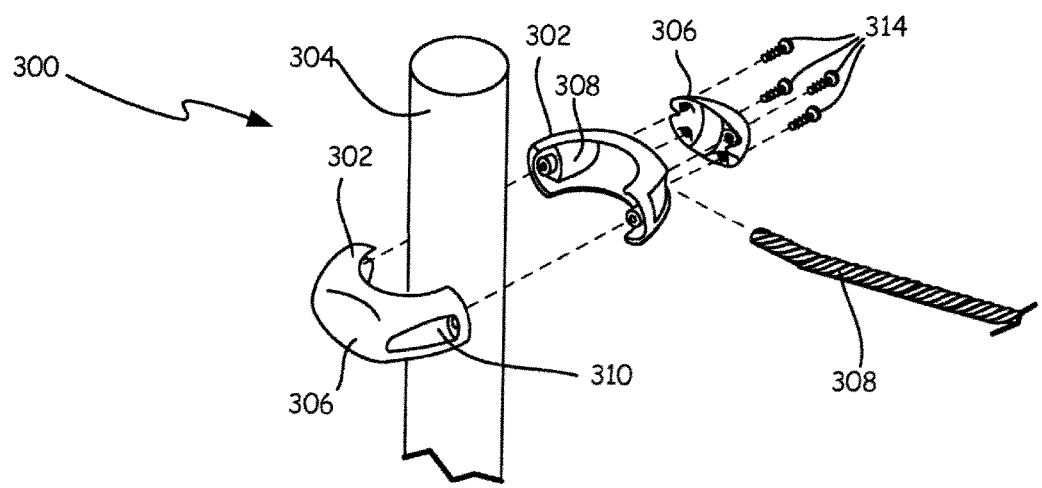
FIG. 3B is an exploded view of a rope clamp system mounted on a pole according to one embodiment.

FIGS. 3A and 3B shows an exploded view of a rope clamp system 300 where two rope clamps are being attached to a pole 304. In FIG. 3A, two rope clamp portions 302 can be used to substantially encircle the pole 304, such that they can be attached to each other by portion fastener 314. Only one portion fastener 314 is shown in FIG. 3A, however, more or fewer portion fasteners 314 could be used. For example, in another embodiment, two portion fasteners 314 are used on either end of the rope clamp portion 302. Additionally, in a further embodiment, four portion fasteners 314 could be used such that two portion fasteners 314 are positioned on either side of the rope clamp portion 302.

After the rope clamp portions 302 are attached to the pole 304, the front cover 306 is put into place such that a rope 308 is positioned between the rope clamp portion 302 and the front cover 306. Once the rope 308 is placed between the holder fastener 312 and the rope clamp portion 302, holder fasteners 312 are used to hold the rope clamp holder and the rope clamp portion 302 together. In one embodiment, the rope 308 is immovably fixed between the rope clamp portion 302 and the front cover 306.

FIG. 3A also shows anti-slide mechanisms 320, configured such that, when engaged with holder fasteners 312, they substantially prevent rope 308 from sliding through the rope clamp portion 302. In one embodiment, each rope clamp portion 302 includes eight anti-slide mechanisms 320, with four placed on the back of the rope clamp holder and a corresponding four placed on the rope clamp portion 102 opposite those placed on the back of the rope clamp holder. However, in another embodiment, the anti-slight mechanisms 320 on the back of the rope clamp holder are staggered from those on the back of the rope clamp portion 102. However, in another embodiment, the rope clamp portion 302 may comprise six or eight anti-slide mechanisms 320. In a further embodiment, the rope clamp portion 302 may only comprise two anti-slide mechanisms 314. In another embodiment, anti-slide mechanisms 320 are placed only on the back of the rope clamp holder. In a further embodiment, anti-slide mechanisms 320 are placed only on the rope clamp portion 302.

As shown in FIG. 3A, in one embodiment, the holder fasteners 312 are bolts; in another embodiment, they are screws. As is shown in FIG. 3A, this configuration has not one stress point on the rope 308, but spreads the pressure along the length of the rope 308 across the full contact area between the rope 308 and the rope clamp portion 302. The full contact area, in one embodiment, extends from a first point 316, where rope 302 enters the rope clamp portion 302, and a second point 318, where rope 308 exits the rope clamp portion 302. In this way, the pressure is spread across the full contact area, instead of at a single contact point, thus allowing the system to be durable for a longer period of time and limiting the risk of the rope breaking. Additionally, the configuration shown in FIG. 3A, keeps the rope 308 at two various angles, in one embodiment the rope may be kept at one of a plurality of angles (one at entry and one at exit) of the rope clamp portion 302, as opposed to one smaller angle, thus, again, acting as a means to reduce the stress and the strain, and the wear and tear on the rope 308. This configuration allows for a safer and more durable rope clamp system for a play structure. This is particularly important for play structures that are positioned outside as they undergo considerably more strain as a result of weather and wearing.

Figure 3C:
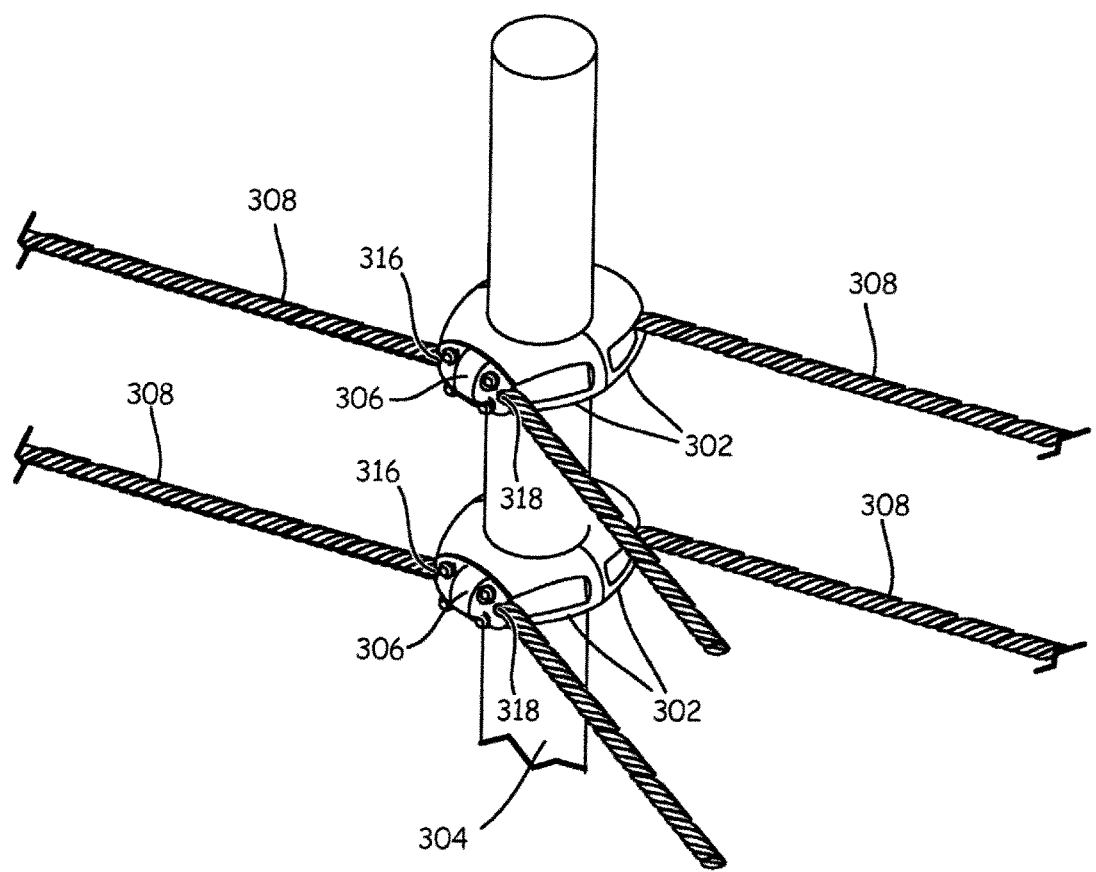
FIG. 3C is a plurality of rope clamp systems mounted on a pole according to one embodiment.

Up until this point, only a single rope clamp system has been illustrated. However, FIG. 3C shows a plurality of rope clamp systems 300 attached to a single pole 304. As shown in FIG. 3C, a plurality of ropes 308 may enter and exit the same rope clamp system 300, or only a single rope 308 may be used in a rope clamp system 300. This versatility of having two ropes enter and exit a single rope clamp system 300 on a single pole, allows for significantly improved versatility in creating a play structure with a limited set of poles 304 and ropes 308. However, in another embodiment, a rope clamp system 300 may only accommodate a single rope 308, as shown in FIG. 3C. Additionally, the same rope 308 may go through multiple rope clamp systems 300 on a single play structure. Further, in another embodiment where the rope clamp covers 306 and rope clamp portions 302 are removeable, the system allows for a variety of rope-based climbing structures are possible. In this way, the rope clamp portions 302 present a modular approach to rope climbing structure creation, allowing for each climbing structure created to be as unique as desired.

Figure 4A:
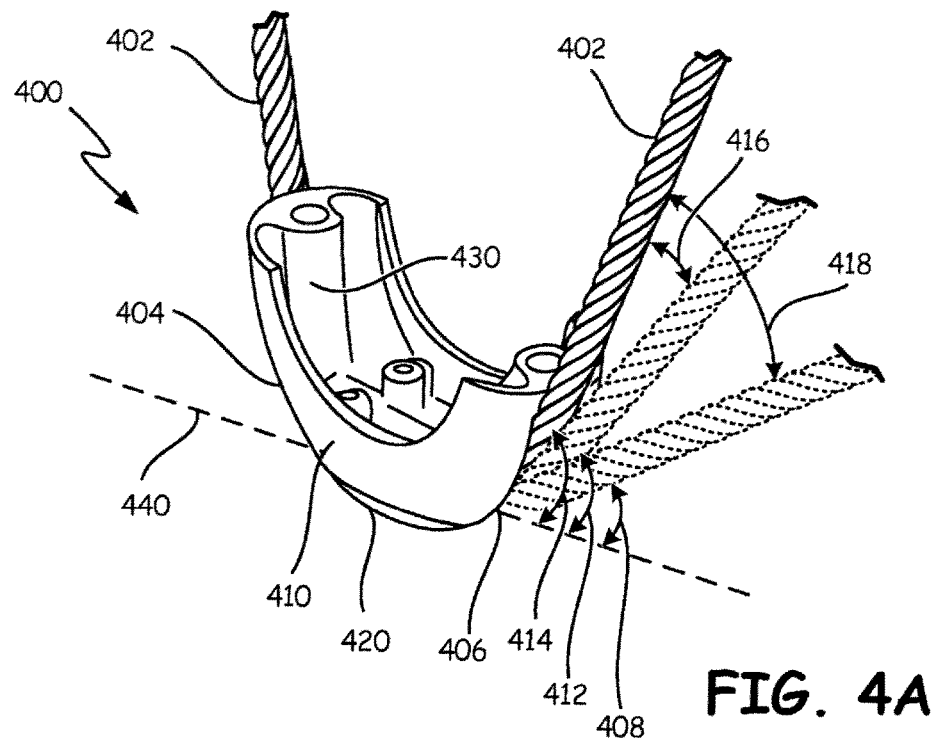
FIG. 4A is a perspective view of a rope clamp portion with a rope according to one embodiment.
Figure 4B:
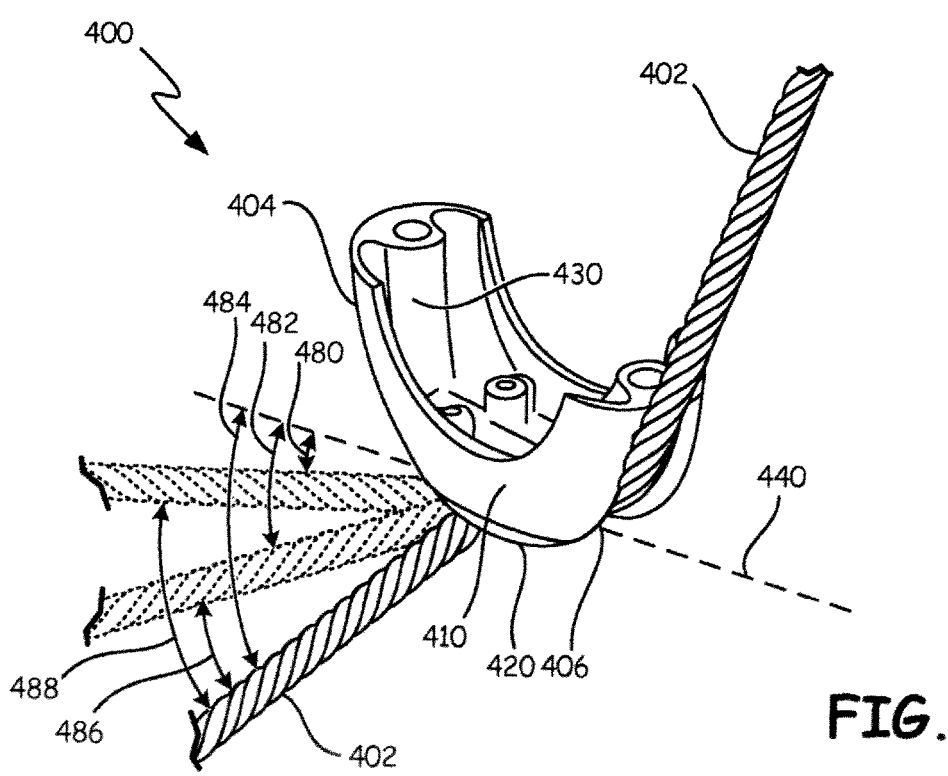
FIG. 4B is a perspective view of a rope clamp portion with a rope according to one embodiment.

FIGS. 4A and 4B are perspective views of a rope clamp system 400 that includes a rope clamp portion 410 with rope 402 according to one embodiment. FIG. 4A shows rope 402 entering the rope clamp portion 410 at a first point 404 and leaving at a second point 406. One advantage of the configuration of rope clamp portion 410 is that it provides considerable flexibility with respect to the positioning of the rope 402, while reducing strain on the rope 402. For example, in one embodiment, the rope 402 is easily moved between a first position to a second position or a third position, as shown in FIG. 4A. The first position is associated with a first angle 414, where angle 414 is defined with respect to an imaginary axis 440 that runs through the front cover 420 of the rope clamp system 400. The first position is also defined such that, in the first position, the rope 402 engages substantially with a side of the rope clamp portion 400. In one embodiment, the side of the rope clamp portion is a groove 430, where the groove 430 provides a position for the rope 402 such that, when stretched, the rope substantially remains within the groove 430. The second position is associated with a second angle 412, located a distance 416 from the first position. The third position is defined as located a distance 418 from the first position, at an angle 408 from the imaginary axis 440. As shown in FIG. 4A, an angle of an entering side of a rope 402 does not need to be the same as an angle of an existing side of the rope 402.

Figure 4C:
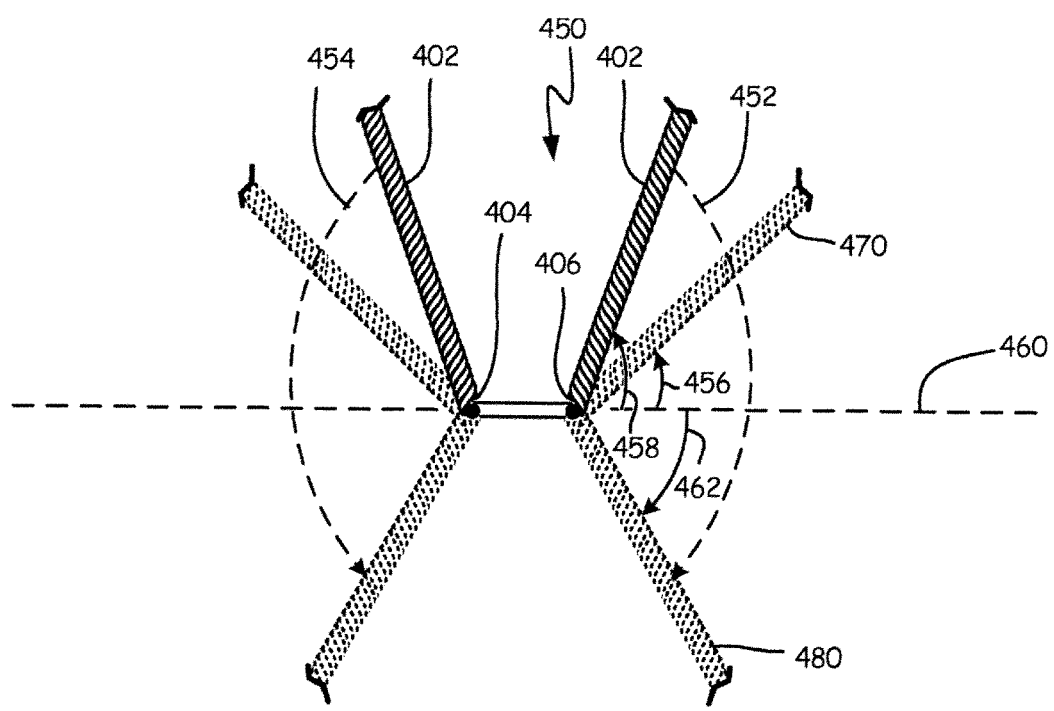
FIG. 4C is a diagrammatic view of a rope positioning within a rope clamp system according to one embodiment.

FIG. 4C is a diagrammatic view of a rope 402 positioning within a rope clamp system 450 according to one embodiment, where the rope clamp portion 410 is not shown. A full range of motion is available for both an entering side of a rope 402 and an existing side of the rope 402. In one embodiment, the entering side of rope 402 has a range of motion 452, while the exiting side of rope 402 has a range of motion 454. Range of motion 452 and range of motion 454 may, in one embodiment, be different according to limitations of the rope clamp portion 410. The entering portion of rope 402 is shown in FIG. 4C moving between a first position, defined by an angle 458, a second position 470 defined by angle 456, and a third position defined by an angle 462. However, these three positions are merely exemplary, and a rope clamp system 450 could, in one embodiment, incorporate any position within a range of motion allowed by the rope clamp system 450. FIG. 4C also shows the first, second and third positions with respect to an imaginary axis 460 that runs through a front cover of a rope clamp system 450. As shown in FIG. 4C, positions of a rope 402 within the rope clamp system 450 are not limited to positions above or below the imaginary axis 460. The benefit of the rope clamp system 450, that includes an entry point 404 and an exit point 406, is that the pressure on the rope 402 is spread across the entire contact area between the rope 402 and the rope clamp system 450, regardless of the position the rope 402 takes within the ranges of motion of the entry portion and the exit portion of rope 402.

Figure 5:
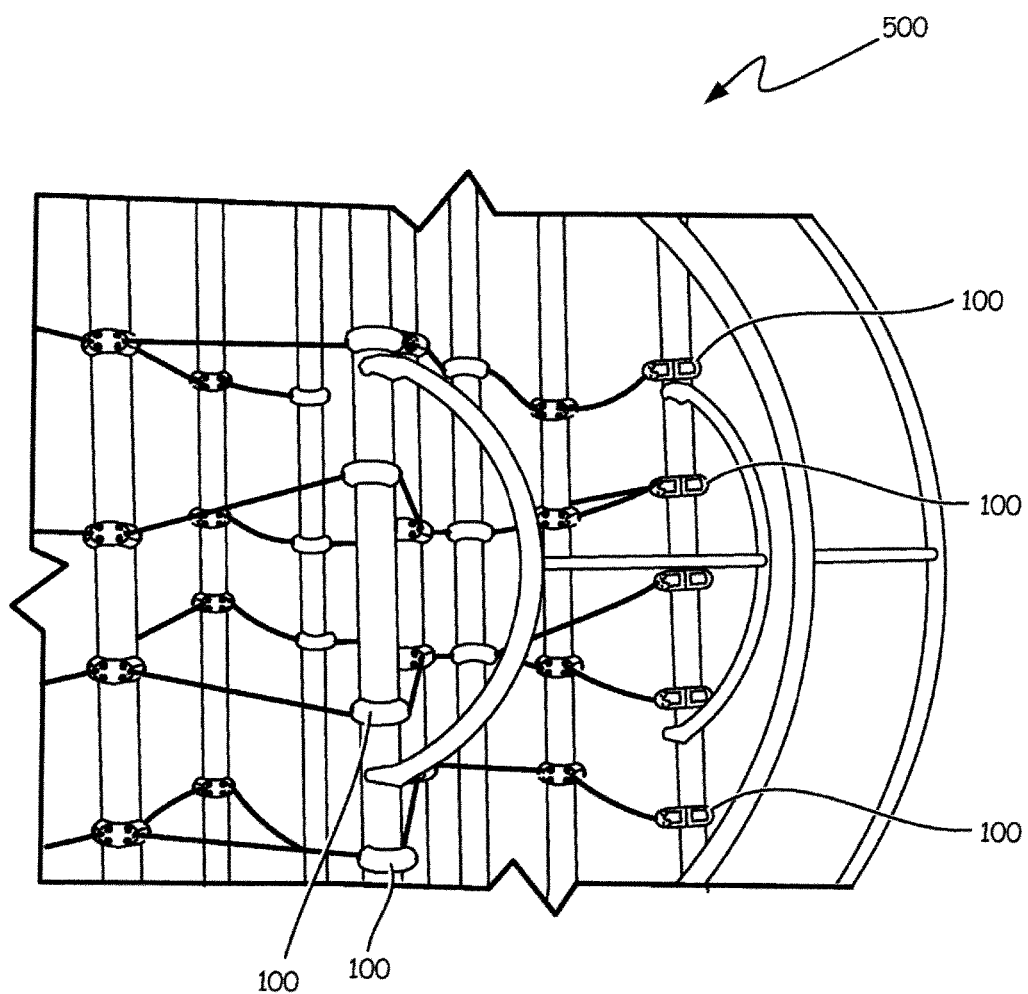
FIG. 5 is a diagrammatic view of a portion of a climbing structure consisting of multiple rope clamp systems in accordance with one embodiment.

FIG. 5 shows a climbing structure 500 composed of a plurality of rope clamp systems 100, wherein multiple rope clamp systems 100 are attached to a single pole (as shown in FIG. 5) and additionally, where a single rope goes through a plurality of rope clamp systems within the same structure. The ability to use these rope clamp systems 100 throughout an entire play structure and to accommodate multiple ropes 104, allows for the creation of a compact climbing structure 400 that presents a child or other user with considerable quantity of play options within a single space.

Although the present invention has been described with reference to preferred embodiments, workers skilled in the art will recognize that changes may be made in form and detail without departing from the spirit and scope of the invention.

What is claimed is:

1. A rope clamp system, comprising:
a first rope clamp portion configured to couple to a second rope clamp portion to securely fasten the rope clamp system to a support structure, the first rope clamp portion comprising:
at least one connection point configured to couple the first rope clamp portion to the second rope clamp portion; and
an end section configured to couple to a cover to securely fasten a rope disposed between the cover and the end section to the rope clamp system.

2. The rope clamp system of claim 1, wherein the first rope clamp portion comprises a rope path configured to receive the rope.

3. The rope clamp system of claim 1, wherein the cover comprises a groove configured to receive the rope upon coupling the end section to the cover.

4. The rope clamp system of claim 2, wherein the rope path comprises at least one anti-slide mechanism configured to fix the rope within the rope path.

5. The rope clamp system of claim 1, wherein the at least one connection point is configured to receive a fastening member to couple the first rope clamp portion to the second rope clamp portion.

6. The rope clamp system of claim 1, wherein the end section comprises at least one receiving portion configured to receive a fastening member to securely couple the end section to the cover.

7. The rope clamp system of claim 2, wherein the end section extends along an entirety of the rope path.

8. The rope clamp system of claim 1, wherein the second rope clamp portion comprises:
a second at least one connection point configured to receive a fastening member to couple the second rope clamp portion to the first rope clamp portion; and
a second end section configured to couple to a second cover to securely fasten a different rope disposed between the second cover and the second end section to the rope clamp system.

9. The rope clamp system of claim 8, wherein the second rope clamp portion comprises a second rope path configured to receive the different rope.

10. The rope clamp system of claim 9, wherein the second rope path comprises at least one anti-slide mechanism configured to fix the different rope within the second rope path.

11. A rope clamp system, comprising:
a first rope clamp portion;
a second rope clamp portion configured to couple to the first rope clamp portion to securely fasten the rope clamp system to a support structure, the second rope clamp portion comprising:
a rope path configured to receive a rope;
at least one connection point configured to receive a fastening member to couple the second rope clamp portion to the first rope clamp portion; and
an end section configured to couple to a cover to fasten the rope within the rope path to the rope clamp system.

12. The rope clamp system of claim 11, wherein the rope path comprises at least one anti-slide mechanism configured to fasten the rope within the rope path.

13. The rope clamp system of claim 11, wherein the end section comprises at least one receiving portion configured to receive a different fastening member to couple the cover to the end section.

14. The rope clamp system of claim 11, wherein the first rope clamp portion and the second rope clamp portion comprise curved bodies such that, upon coupling the second rope clamp portion to the first rope clamp portion, the rope clamp system forms a central aperture configured to receive the support structure.

15. The rope clamp system of claim 11, wherein the support structure comprises a pole.

16. The rope clamp system of claim 11, wherein the rope is configured to enter the rope path at a first point and exit the rope path at a second point, and wherein, upon coupling the cover to the end section, an angular position of the rope is adjustable at the first and second points.

17. A rope clamp system, comprising:
a first rope clamp portion;
a cover;
a second rope clamp portion configured to couple to the first rope clamp portion to securely fasten the rope clamp system to a support structure and the cover to securely couple a rope to the rope clamp system, the second rope clamp portion comprising:
a rope path configured to receive the rope;
at least one connection point configured to receive a fastening member to couple the second rope clamp portion to the first rope clamp portion; and
an end section configured to couple to the cover to securely couple the rope to the rope clamp system.

18. The rope clamp system of claim 17, wherein the rope path comprises at least one anti-slide mechanism configured to fasten the rope within the rope path.

19. The rope clamp system of claim 17, wherein the cover comprises:
a groove configured to receive the rope upon coupling the cover to the end section; and
at least one receiving portion configured to receive a different fastening member to securely couple the cover to the end section.

20. The rope clamp system of claim 17, wherein the rope is configured to enter the rope path at a first point and exit the rope path at a second point, and wherein, upon coupling the cover to the end section, an angular position of the rope is adjustable at the first and second points.

* * * * *